(12) United States Patent
Kim et al.

(10) Patent No.: US 7,777,428 B2
(45) Date of Patent: Aug. 17, 2010

(54) APPARATUS AND METHOD FOR CONTROLLING DRIVING OF LAMP

(75) Inventors: Taek Soo Kim, Gwangsan-gu (KR); Hyun Sik Kim, Seo-gu (KR)

(73) Assignee: LG Innotek Co., Ltd., Seoul (KR)

( * ) Notice: Subject to any disclaimer, the term of this patent is extended or adjusted under 35 U.S.C. 154(b) by 39 days.

(21) Appl. No.: 12/067,478

(22) PCT Filed: Jul. 13, 2007

(86) PCT No.: PCT/KR2007/003409
§ 371 (c)(1),
(2), (4) Date: Mar. 20, 2008

(87) PCT Pub. No.: WO2008/007925
PCT Pub. Date: Jan. 17, 2008

(65) Prior Publication Data
US 2009/0115339 A1    May 7, 2009

(30) Foreign Application Priority Data
Jul. 14, 2006  (KR) ............... 10-2006-0066538
Jun. 14, 2007  (KR) ............... 10-2007-0058386

(51) Int. Cl.
*G05F 1/00* (2006.01)

(52) U.S. Cl. ............ 315/291; 315/224; 315/278; 315/277; 315/307; 315/209 R; 363/25; 363/36; 323/280

(58) Field of Classification Search ............. 315/209 R, 315/224, 220, 255, 276–278, 307, 312, 325, 315/DIG. 7; 363/25, 36, 98, 56.08; 323/282, 323/280; 345/52, 102
See application file for complete search history.

(56) References Cited

U.S. PATENT DOCUMENTS

| | | | |
|---|---|---|---|
| 5,166,579 A | 11/1992 | Kawabata et al. | |
| 5,652,479 A * | 7/1997 | LoCascio et al. | ............ 315/225 |
| 6,633,138 B2 | 10/2003 | Shannon et al. | |
| 7,183,724 B2 * | 2/2007 | Ball | ............ 315/274 |
| 7,253,569 B2 * | 8/2007 | Liu | ............ 315/291 |
| 7,394,209 B2 * | 7/2008 | Lin et al. | ............ 315/247 |

FOREIGN PATENT DOCUMENTS

| | | |
|---|---|---|
| JP | 11-121188 | 4/1999 |
| KR | 10-2004-0045988 | 12/2005 |

* cited by examiner

*Primary Examiner*—Haissa Philogene
(74) *Attorney, Agent, or Firm*—Saliwanchik, Lloyd & Saliwanchik

(57) ABSTRACT

Disclosed are an apparatus and a method for controlling driving of a lamp. The apparatus for controlling driving of a lamp includes a plurality of lamps, a switching module for switching supplied power to output an alternating current (AC) signal, a trans-module for converting the alternating signal into high-voltage signals having different phases to supply the high-voltage signals to the lamps, an open lamp detecting module for adding low-voltage signals having different phases feedback from the trans-module to detect open states of the lamps, and a controller for controlling an operation of the switching module by a signal detected in the open lamp detecting module.

20 Claims, 5 Drawing Sheets

[Fig. 1]
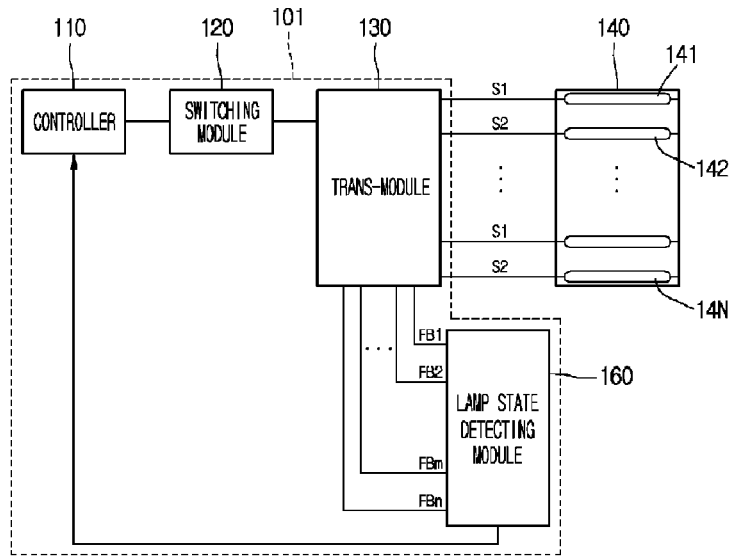
[Fig. 2]
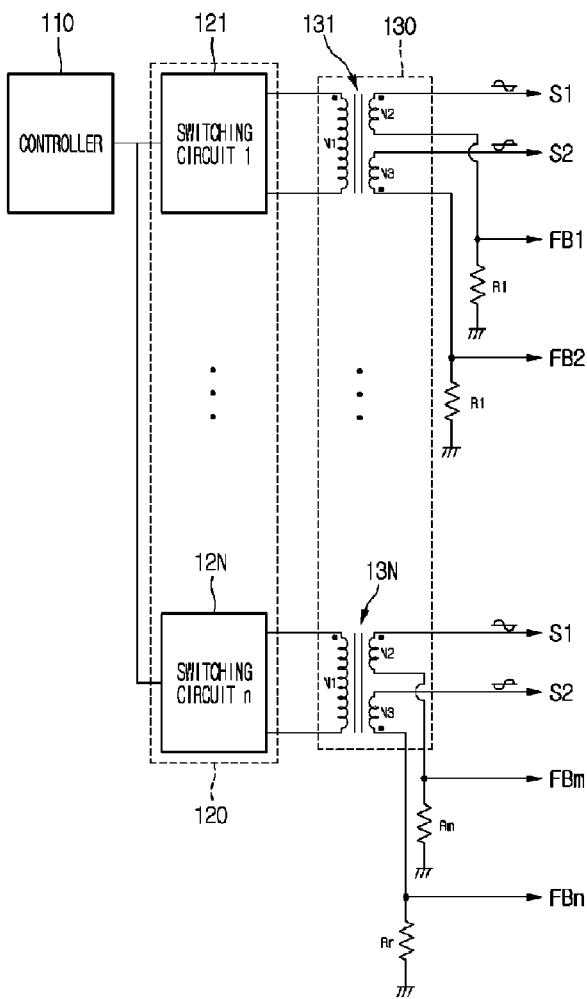

[Fig. 3]
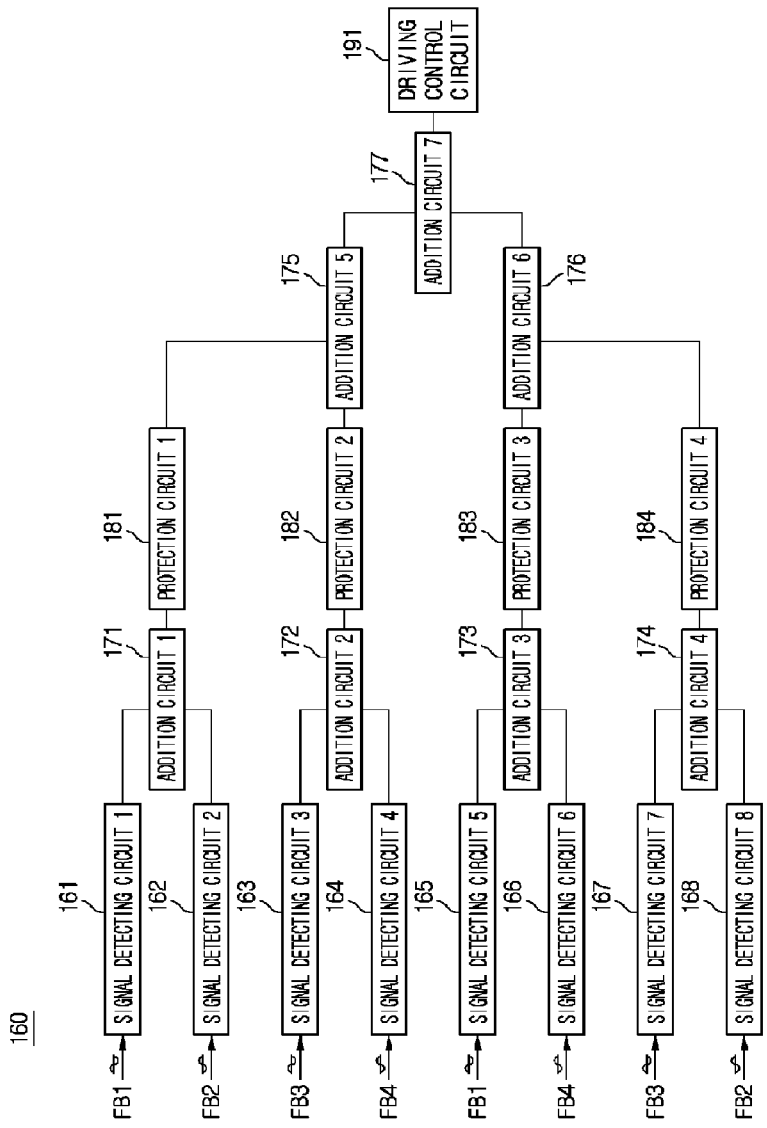
[Fig. 4]
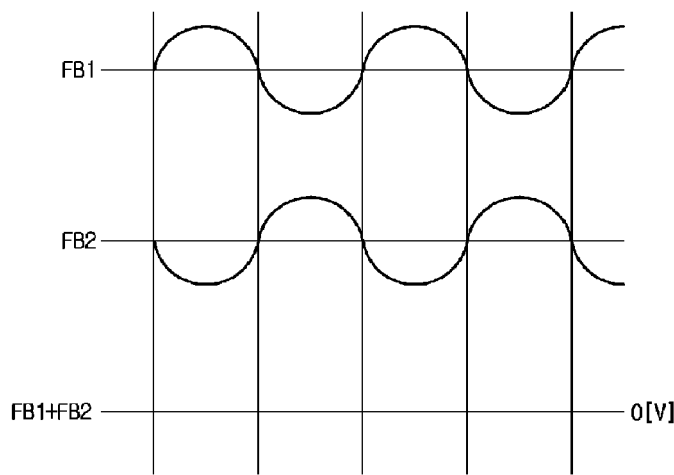

[Fig. 5]
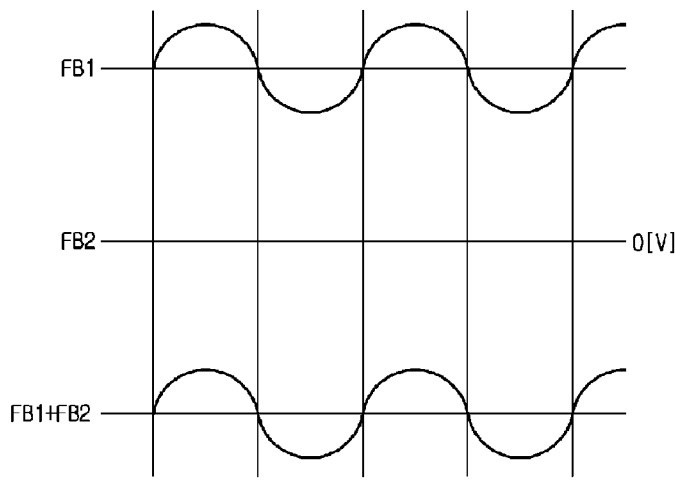
[Fig. 6]
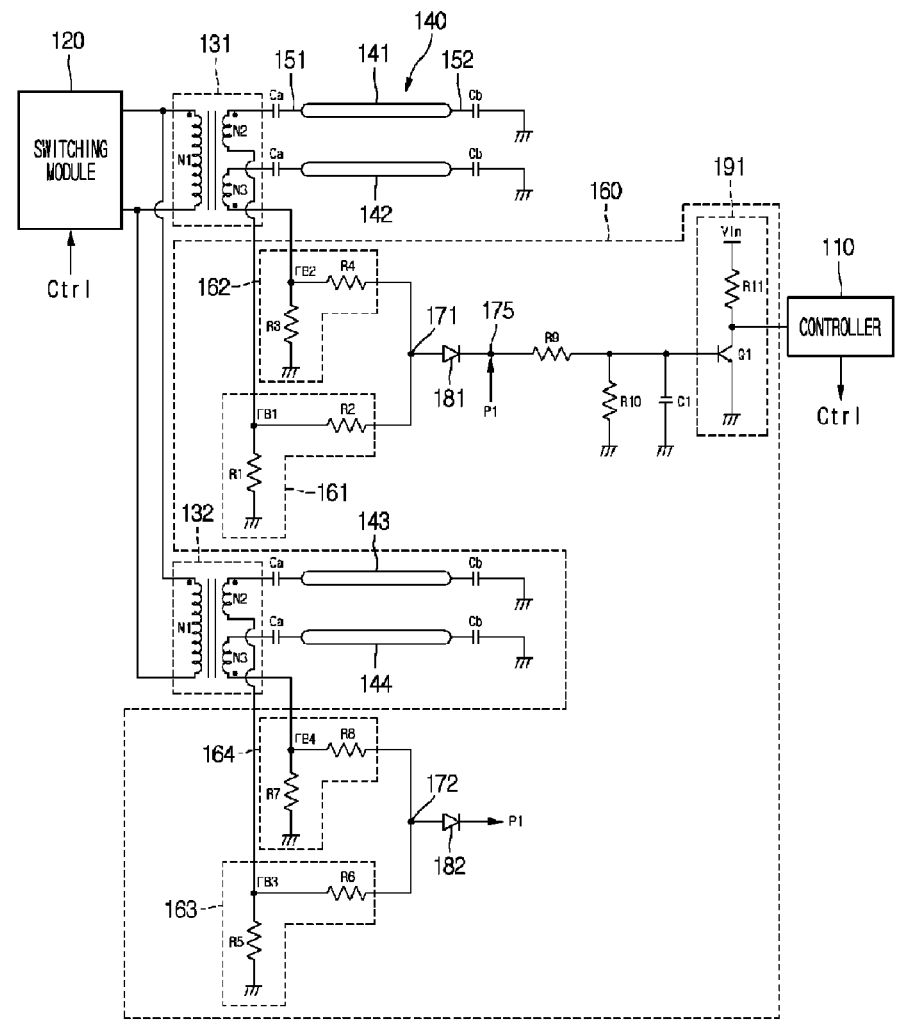

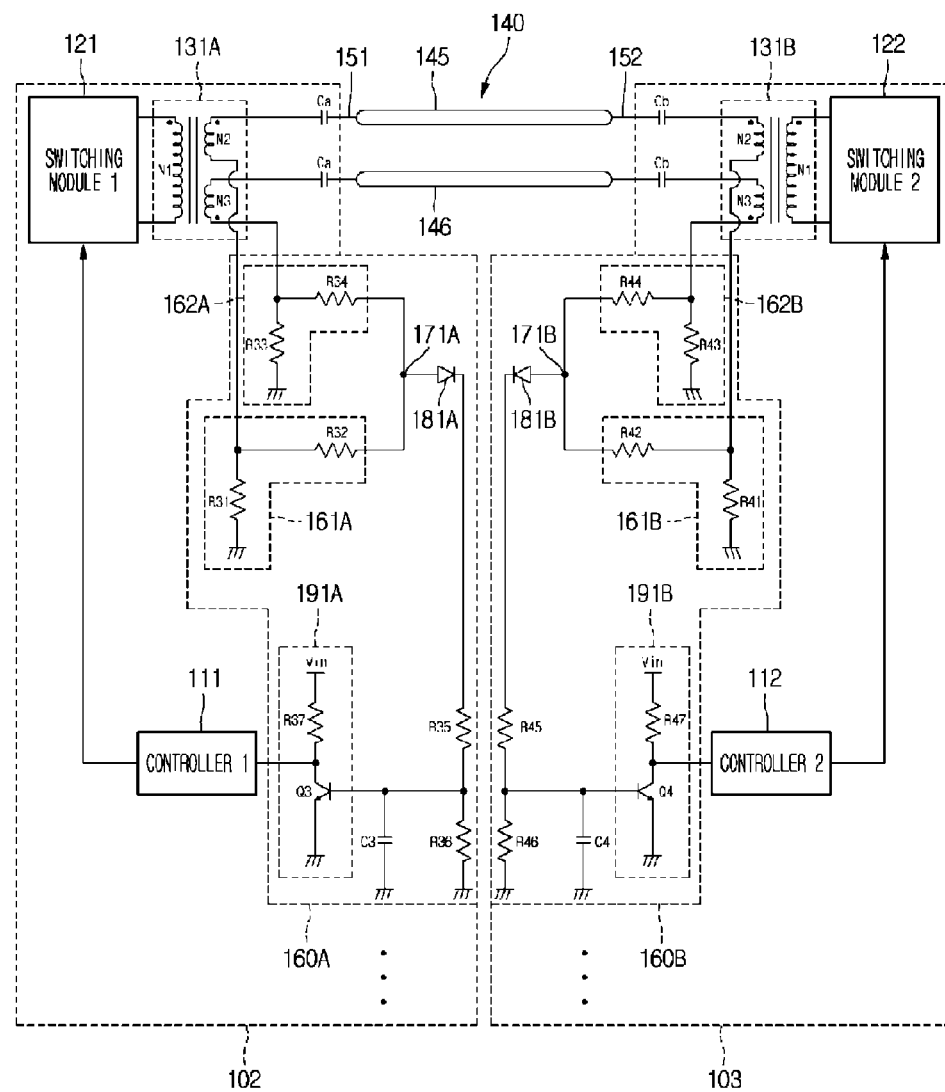
[Fig. 7]

[Fig. 8]
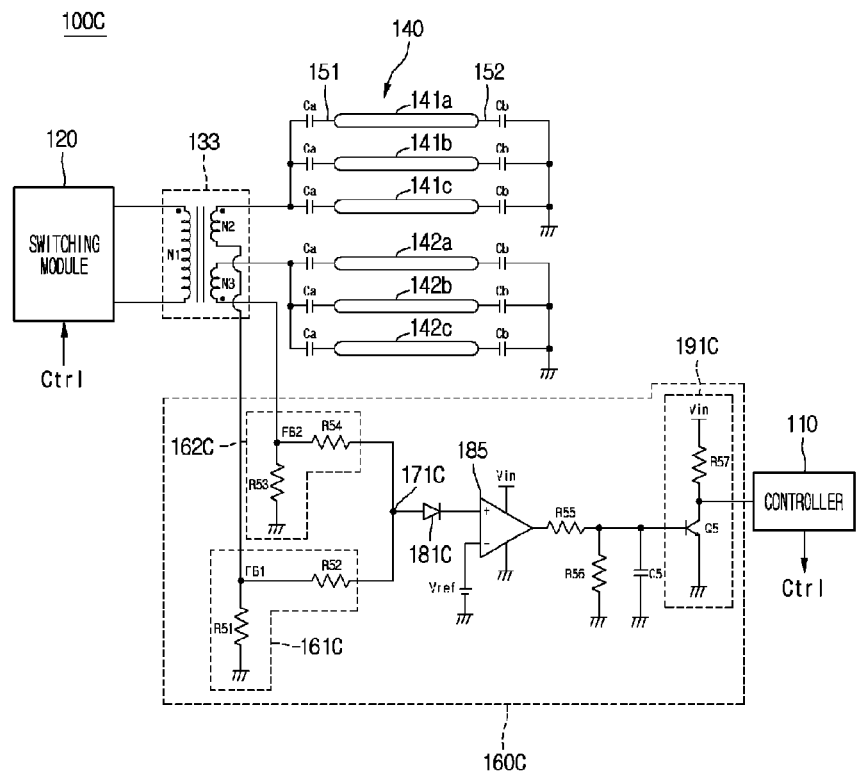
[Fig. 9]
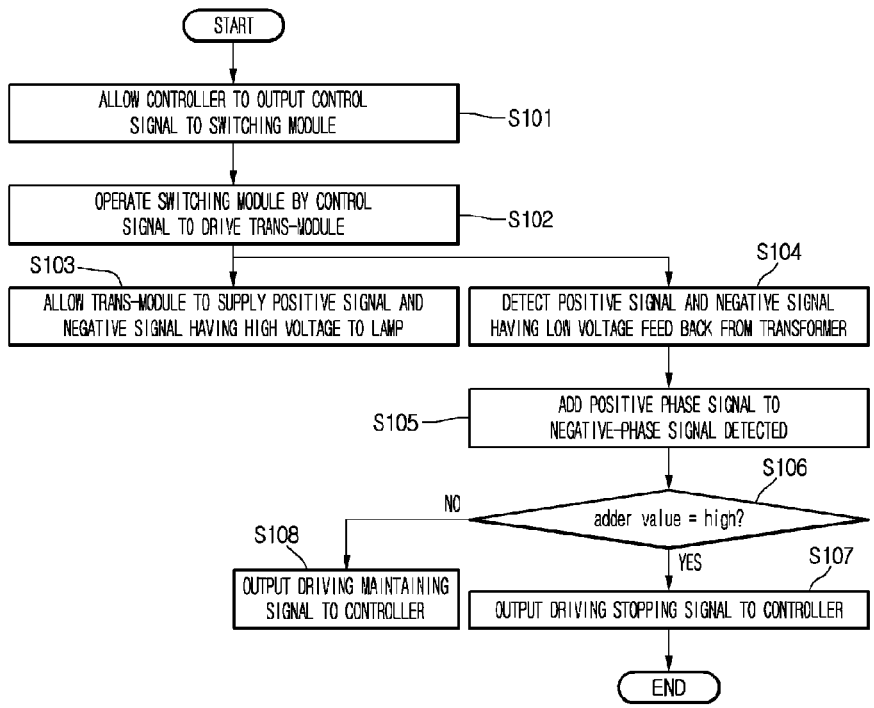

APPARATUS AND METHOD FOR CONTROLLING DRIVING OF LAMP

CROSS-REFERENCE TO RELATED APPLICATION

This application is the U.S. national stage application of International Patent Application No. PCT/KR2007/003409, filed Jul. 13, 2007, the disclosure of which is hereby incorporated by reference in its entirety.

TECHNICAL FIELD

The embodiment relates to an apparatus and a method for controlling the driving of a lamp.

BACKGROUND ART

Liquid crystal displays (LCDs) show a tendency that its application field is gradually increased due to the characteristics such as light weight, thin thickness, and low-power-consumption driving. Owing to this tendency, the LCDs have been used for office automation equipment, audio/video equipment, and so on.

Meanwhile, the LCDs adjust an amount of transmitted light and image signals applied to a plurality of control switches arranged in a matrix pattern, thereby displaying a desired image on a screen.

Since such the LCDs are non-emissive devices, the LCDs requires a light source such as a backlight. The light source for the backlight includes a cold cathode fluorescent lamp (hereinafter, referred to as "CCFL").

Such a lamp is driven by receiving an alternating current (AC) signal having high voltage through a lamp driving circuit. However, when driving the lamp, the lamp may be opened due to defects and erroneous input voltage thereof. Accordingly, an open lamp protecting circuit is necessary to detect the open state of the lamp and protect the lamp driving circuit.

DISCLOSURE OF INVENTION

Technical Problem

The embodiment provides an apparatus and a method for controlling the driving of a lamp, capable of detecting an open state of the lamp to protect a circuit for driving the lamp.

The embodiment provides an apparatus and a method for controlling the driving of a lamp, capable of adding a positive signal to a negative signal feedback from a transformer to detect an open state of the lamp and abnormal voltage of the transformer.

The embodiment provides an apparatus and a method for controlling driving of a lamp, capable of simplifying a circuit by reducing the number of parts used in an open lamp detecting module.

Technical Solution

An embodiment provides an apparatus for controlling driving of a lamp comprising a plurality of lamps, a switching module for switching supplied power to output an alternating current (AC) signal, a trans-module for converting the alternating signal into high-voltage signals having different phases to supply the high-voltage signals to the lamps, an open lamp detecting module for adding low-voltage signals having different phases feedback from the trans-module to detect open states of the lamps, and a controller for controlling an operation of the switching module by a signal detected in the open lamp detecting module.

An embodiment provides an apparatus for controlling driving of a lamp comprising a plurality of lamps having first and second electrodes, and an inverter connected to at least one electrode of the lamp, wherein the inverter comprises a switching module for switching supplied power to output alternating current (AC), a trans-module for converting the alternating current (AC) of the switching module into a positive signal and a negative signal having high voltage to supply the positive signal and the negative signal to the lamp, an open lamp detecting module for adding a positive signal and a negative signal having low voltage, which are feedback from the trans-module, to detect an open state of the lamp, and a controller for controlling an operation of the switching module by a signal detected in the open lamp detecting module.

An embodiment provides a method for controlling driving of a lamp, the method comprising the steps of operating a switching module by a control signal of a controller, allowing each transformer to supply a positive signal and a negative signal having high voltage according to an operation of the switching module, detecting an open state of a lamp by adding a positive signal to a negative signal having low voltage, which are feedback from the transformer, and outputting a driving stopping signal to the controller if the open state of the lamp is detected.

Advantageous Effects

In an apparatus and a method for controlling the driving of a lamp according to the present embodiment, an open state of a lamp and the abnormal voltage of a transformer can be detected through an arithmetic scheme to add signals having polarities different from each other in the unit of one pair.

In addition, circuit parts of an open lamp detecting module can be simplified. Accordingly, the manufacturing costs of an inverter can be reduced, and defective proportion of the parts can be reduced through the simplified circuit structure of the open lamp detecting module.

BRIEF DESCRIPTION OF THE DRAWINGS

FIG. 1 is a block diagram showing the structure of an apparatus for controlling the driving of a lamp according to the embodiment;

FIG. 2 is a circuit diagram showing a trans-module and a switching module shown in FIG. 1;

FIG. 3 is a block diagram showing an open lamp detecting module shown in FIG. 1;

FIG. 4 is a waveform showing a feedback signal detected in a normal state of a lamp in an open lamp detecting module according to the embodiment;

FIG. 5 is a waveform showing a feedback signal detected in an open state of a lamp in an open lamp detecting module according to the embodiment;

FIG. 6 is a view showing the structure of an apparatus for controlling the driving of a lamp according to a first embodiment;

FIG. 7 is a view showing the structure of an apparatus for controlling the driving of a lamp according to a second embodiment;

FIG. 8 is a view showing the structure of an apparatus for controlling the driving of a lamp according to a third embodiment; and FIG. 9 is a flowchart showing a method for controlling the driving of a lamp according to an embodiment.

BEST MODE FOR CARRYING OUT THE INVENTION

Hereinafter, embodiments will be described with respect to accompanying drawings.

FIG. 1 is a block diagram showing the structure of an apparatus for controlling the driving of a lamp according to the embodiment.

Referring to FIG. 1, an apparatus 100 for controlling the driving of a lamp includes an inverter 101 and a lamp unit 140 provided with a plurality of lamps 141 to 141N.

The inverter 101 converts lamp driving power supplied from an exterior into an AC signal, and then the AC signal into a positive-phase signal S1 and a negative-phase signal S2 having high voltage. Then, the inverter 101 provides the positive-phase signal S1 and the negative-signal S2 to a plurality of lamps 141 to 14N. In this case, the positive-phase signal S1 and the negative-phase signal S2 have a phase difference of 180 degrees therebetween.

The lamps 141 to 14N are provided in the lamp unit 140 in parallel to each other, and two signals S1 and S2 having different phases are provided to the lamps 141 to 14N. The lamps 141 to 14N include one of a cold cathode fluorescent lamp (CCFL), an external electrode fluorescent lamp (EEFL), a hot cathode fluorescent lamp (HCFL), and an external and internal electrode fluorescent lamp (EIFL). The lamps 141 to 14N include a glass tube, inert gases (Ar, Ne, etc.) inside the glass tube, and electrodes mounted on both end portions of the glass tube. The glass tube is filled with the inert gases, and a fluorescent substance is coated on the inner wall of the glass tube.

The inverter 101 includes a controller 110, a switching module 120, a trans-module 130, and an open lamp detecting module 160. The controller 110 controls the switching operation of the switching module 120 in response to an input puls-width modulation (PWM) signal. The switching module 120 switches the lamp driving power received from a power terminal to convert the lamp driving power into an AC signal by the control signal of the controller 110.

The trans-module 130 transforms the AC signal of the switching module 120 into the positive-phase signal S1 and the negative-phase signal S2 having high voltage to supply the positive-phase signal S1 and the negative-phase signal S2 to the lamp unit 140. The trans-module 130 can adjust the intensity and the output phase of the voltage of the secondary side of the transformer according to a winding ratio and a winding direction of an internal transformer.

The trans-module 130 has high voltage terminals of windings, which are provided at the second side thereof and connected to the lamps 141 to 14N, and low voltage terminals of the windings, which are provided at the second side thereof and connected to the open lamp detecting module 160.

The open lamp detecting module 160 detects signals FB1 to FBn feedback from the trans-module 130. The open lamp detecting module 160 detects a positive-phase signal (hereinafter, referred to as "positive signal") and a negative-phase signal (hereinafter, referred to as "negative signal") having low voltage. The open lamp detecting module 160 adds the positive signal to the negative signal in the unit of one pair so as to output the addition result. In this case, since the positive signal and the negative signal have the same size and polarities opposite to each other, the sum of the normal two signals becomes a low signal. However, if one lamp is opened, the sum of the positive signal and the negative signal becomes a high signal.

In this case, the open lamp detecting module 160 may add positive signals to negative signals to output the addition result. In addition, the open lamp detecting module 160 may add negative signals to positive signals to output the addition result. This is necessary for exactly detecting the open states of lamps by checking the signals twice even if two lamps are simultaneously opened.

The open lamp detecting module 160 detects the middle levels of the positive signal and the negative signal, thereby outputting a driving stopping signal, or a driving maintaining signal. Thus, the open lamp detecting module 160 can detect voltage fault of the trans-module 130, or the open states of lamps 141 to 14N.

FIG. 2 is a circuit diagram showing the structure of the switching module 120 and the trans-module 130.

Referring to FIG. 2, the switching module 120 includes a plurality of switching circuits 121 to 12N, and the switching circuits 121 to 12N are connected to the transformers 131 to 13N of the trans-module 130, respectively.

In this case, the switching circuits 121 to 12N perform switching operations by a control signal of the controller 110 to output an AC signal to the transformers 131 to 13N. The structure of the switching circuits 121 to 12N and the transformers 131 to 13N may be modified, and the embodiment is not limited to this.

The transformers 131 to 131N of the trans-module 130 are provided with a first winding N1 at a primary side and second and third windings N2 and N3 at the secondary side. The high voltage terminals of the second winding N2 and the third winding N3 supply two signals S1 and S2 having different phases to the lamps, and the sum of the phases of the two signals becomes zero.

In this case, the number of the transformers 131 to 13N is identical to the number of the lamps. According to the embodiment, at least two signals may be provided. For example, regarding the phase of a signal supplied to each lamp, N (2≦N≦36) driving signals may be provided such that the driving signals has a phase difference corresponding to a value obtained by dividing 360° by N (2≦N≦36) lamp unit. At this time, the sum of phase differences of the N driving signals must be zero.

The transformers 131 to 13N output a positive signal S1 and a negative signal S2 having high voltage through the high voltage terminals of the second winding N2 and the third winding N3 at the secondary side thereof. The transformers 131 to 13N feed back positive signals FB1 to FBm and negative signals FB2 to FBn through the low terminals of the second winding N2 and the third winding N3 at the secondary side thereof. The feedback signals FB1 to FBn are low voltage signals having the same phases as those of the signals S1 and S2 output from the high voltage terminals at the second sides of the transformers 131 to 13N.

In this case, the feedback signals FB1 to FBn are output between the low voltage terminals at the second side of the transformers 131 to 13N and second terminals of grounded resistors R1 to RN.

FIG. 3 is a block diagram showing the structure of the open lamp detecting module 160 according to the embodiment, in which the open lamp detecting module 160 detects the open states of lamps based on the four feedback signals FB1 to FB4.

Referring to FIG. 3, the open lamp detecting module 160 includes first to eighth signal detecting circuits 161 to 168, first to seventh addition circuits 171 to 177, first to fourth protection circuits 181 to 184, and a driving control circuit 191.

The first to eighth signal detecting circuits 161 to 168 branch into two paths to detect the feedback signals FB1 to FB4. The first and third feedback signals FB1 and FB3 are positive signals, and the second and fourth feedback signals FB2 and FB4 are negative signals.

The first and fifth signal detecting circuits 161 and 165 detect a positive signal, which is the first feedback signal. The second and eighth signal detecting circuits 162 and 168 detect a negative signal, which is the second feedback signal. The third and seventh signal detecting circuits 163 and 167 detect a positive signal, which is the third feedback signal, and the fourth and sixth signal detecting circuits 164 and 166 detect a negative signal, which is the fourth feedback signal.

In this case, the first to fourth addition circuits 171 to 174 may be realized as the first addition node. The fifth and sixth addition circuits 175 and 176 may be realized as the second addition node. The seventh addition circuit 177 may be realized as the third addition node. In addition, the fifth to seventh addition circuits 175 to 177 may be realized as the second addition node. The embodiment is not limited to this.

The first to fourth addition circuits 171 to 174 add one positive signal to one negative signal in the unit of a pair. For example, the first addition circuit 171 adds the positive signal and the negative signal detected by the first and second signal detecting circuits 161 and 162. The second addition circuit 172 adds two signals detected by the third and fourth signal detecting signals 163 and 164. The third addition circuit 173 adds two signals detected by the fifth and sixth detection circuits 165 and 166. The fourth addition circuit 174 adds two signals detected by the seventh and eight detection circuits 167 and 168.

As shown in FIG. 4, the first addition circuit 171 adds the normal-state first and second feedback signals FB1 and FB2, thereby outputting a low signal (e.g., 0V).

As shown in FIG. 5, the first addition circuit 171 adds the normal-state first feedback signal FB1 and the open-sate second feedback signal FB2, thereby outputting the first feedback signal FB1. For example, if a lamp relative to the second feedback signal FB2 is opened, the second feedback signal FB2 is reduced to a low level (e.g., 0V) or less. Since the phase difference between the first and second feedback signals is not exactly 180°, the addition result FB1+FB2 of the two signals may become a high signal.

The fifth addition circuit 175 adds the addition results of the first and second addition circuits 171 and 172. The six addition circuit 176 adds the addition results of the third and fourth addition circuits 173 and 174. The seven addition circuit 177 adds the addition results of the fifth and sixth addition circuits 175 and 176.

The first to seventh addition circuits 171 to 177 may perform an addition operation based on results obtained by adding one positive signal to two negative signals different from each other. In addition, the first to seventh addition circuits 171 to 177 may perform an addition operation based on results obtained by adding one negative signal to two positive signals different from each other.

As shown in FIGS. 2 and 3, the first and second addition circuits 171 and 172 add the signals FB1 and FB2, and FB3 and FB4, which are feedback from the same transformer. In addition, the third and fourth addition circuits 173 and 174 add the feedback signals FB1 and FB4 and FB2 and FB3, which are feedback from different transformers.

As described above, since the open lamp detecting module 160 can check the feedback signal twice, the open lamp detecting module 160 can detect the open state of the lamps even if two feedback signals applied to one addition circuit are in open states.

The first to fourth protection circuits 181 to 184 are arranged in the output terminals of the first to fourth addition circuits 171 to 174, thereby cutting off over-voltage applied to the transformer and passing through only forward current. The arrangement of the protection circuits 181 to 184 may be changed, and the embodiment is not limited to this.

The driving control circuit 191 outputs the driving stopping signal or the driving maintaining signal to the controller 110 according to the addition result of the seventh addition circuit 177. If the addition result of the seventh addition circuit 177 is a high signal, the driving control circuit 191 determines the high signal as the open state of a lamp, thereby outputting the driving stopping signal. If the addition result of the seventh addition circuit 177 is a low signal, the driving control circuit 191 determines the low signal as the normal state of the lamp, thereby outputting as the driving maintaining signal.

FIG. 6 is a circuit diagram showing the structure of an apparatus 100A for controlling the driving of a lamp according to the first embodiment, in which the apparatus 100A for controlling the driving of a lamp detects open states of lamps 141 to 144 connected to two transformers 131 and 133.

Referring to FIG. 6, the switching module 120 outputs AC signals to the first and second transformers 131 and 132. First electrodes 151 of the lamps 141 to 144 are connected to high voltage terminals of the second winding N2 and the third winding N3 provided at the secondary sides of the first and second transformers 131 and 132. In addition, the open lamp detecting module 160 is connected to low voltage terminals of the second windings N2 and the third windings N3 at the secondary side of the transformers 131 and 132. Both electrodes 151 and 152 of the lamps 141 and 142 are serially connected to high voltage capacitors Ca and Cb.

The first and second signal detecting circuits 161 and 162 are connected to low voltage terminals of the second winding N2 and the third winding N3 at the secondary side of the first transformer 131. The third and fourth signal detecting circuits 163 and 164 are connected to low voltage terminals of the second winding N2 and the third winding N3 at the secondary side of the second transformer 132, respectively.

The first to fourth signal detecting circuits 161 to 164 may be realized by using division resistors R1 and R2, R3 and R4, R5 and R6, and R7 and R8, respectively. The first and second detecting circuits 161 and 162 detect a positive signal FB1 and a negative signal FB2, which are feedback at the second side of the first transformer 131. The third and fourth signal detecting circuits 163 and 164 detect a positive signal FB3 and a negative signal FB4, which are feedback at the second side of the second transformer 132.

The first and second addition circuits 171 and 172 may be realized as addition nodes. The first addition circuit 171 adds the positive and negative signals, which are detected from the first and second signal detecting circuits 161 and 162, to each other. The second addition circuit 172 adds the positive and negative signals, which are detected from the third and fourth signal detecting circuits 163 and 164, to each other.

The first and second protection circuits 181 and 182 may be realized by using diodes, and provided at output terminals of the first and second addition circuits 171 and 172 to cut off reversely flowing signals.

The third addition circuit 175 adds addition results from the first and second addition circuits 171 and 172 to each other. The number of the signal detecting circuits and the addition circuits may vary depending on the number of transformers.

The output signal of the third addition circuit 175 passes through resistors R9 and R10 and a condenser C1 such that noise is removed from the output signal. Then, the output signal is input to the driving control circuit 191.

The driving control circuit 191 may be realized as a transistor Q1, and the transistor Q1 is turned on/off by the output signal of the third addition circuit 175 input to a base of the transistor Q1. In detail, if a high signal is applied to the base of the transistor Q1, the transistor Q1 is turned on, and outputs a driving stopping signal, which is a low signal, to a collector thereof. If a low signal is applied to the base of the transistor Q2, the transistor Q1 is turned off, and outputs a driving maintaining signal, which is a high signal, to the collector thereof.

The controller 110 determines that the specific lamps 141 to 144 are opened by the driving stopping signal of the open lamp detecting module 160, and outputs an open control signal Ctrl to the switching module 120 to open the switching module 120 and the transformers 131 and 132.

FIG. 7 is a view showing the structure of an apparatus 100B for controlling driving of a lamp according to a second embodiment. The same reference numerals are assigned to the same elements as those shown in FIG. 6, and detailed description thereof will be omitted in order to avoid redundancy.

Referring to FIG. 7, the first and second inverters 102 and 103 are provided at both end portions of the lamp unit 140. The open states of the electrodes 151 and 152 of the lamps 145 and 146 are detected through the first and second inverters 102 and 103.

The first inverter 102 includes a first controller 111, a first switching module 121, a first transformer 131A, and a first open lamp detecting module 160A. The second inverter 103 includes a second controller 112, a second switching module 122, a second transformer 131B, a second open lamp detecting module 160B.

Hereinafter, details will briefly described regarding the first inverter 102. The first electrodes 151 of the lamps 145 and 146 are connected to the high voltage terminals of the second and third windings N2 and N3 at the secondary side of the first transformer 131A. A first open lamp detecting module 160A is connected to low voltage terminals of the second and third windings N2 and N3 at the secondary side of the first transformer 131A. The first open lamp detecting module 160A includes first and second signal detecting circuits 161A and 162A, an addition circuit 171A, a protection circuit 181A, and a driving control circuit 191A. The first open lamp detecting module 160A detects an open state with respect to the first electrodes 151 of the lamps 145 and 146.

Hereinafter, details will briefly described regarding the second inverter 103. The second electrodes 152 of the lamps 145 and 146 are connected to the high voltage terminals of the second and third windings N2 and N3 at the secondary side of the second transformer 131B. The second open state detecting module 160B is connected to the low voltage terminals of the second and third windings N2 and N3 at the secondary side of the second transformer 131B. The second open lamp detecting module 160B includes first and second signal detecting circuits 161B and 162B, an addition circuit 171B, a protection circuit 181B, and a driving control circuit 191B. The second open lamp detecting module 160B detects an open state with respect to the second electrodes 152 of the lamps 145 and 146.

FIG. 8 is a view showing the structure of an apparatus 100C for controlling driving of a lamp according to a third embodiment. The same reference numerals are assigned to the same elements as those shown in FIG. 6, and detailed description thereof will be omitted in order to avoid redundancy.

Referring to FIG. 8, signals having different phases are provided by using one transformer 133 to drive all lamps 141a, 141b, and 141c, and 142a, 142b, and 142c of the lamp unit 140.

The lamps 141a, 141b, and 141c, and 142a, 142b, and 142c are connected to the high voltage terminals of the second and third windings N2 and N3 at the secondary side of the transformer 133. In this case, a high-voltage AC signal supplied through the second winding N2 at the second side of the transformer 133 is different from a high-voltage AC signal supplied through the third winding N3.

Accordingly, the open lamp detecting module 160C adds a signal detected by the first signal detecting circuit 161C to a signal detected by the second signal detecting circuit 162C through the addition circuit 171C. The addition signal obtained in the addition circuit 171C is input to a non-inversion terminal (+) of the comparator 185, and the comparator 185 compares a signal input to the non-inversion terminal (+) with reference voltage Vref applied to an inversion terminal (−). In this case, if the addition signal is greater than the reference voltage Vref, the comparator 185 outputs a high signal. If the addition signal is lower than the reference voltage Vref, the comparator 185 outputs a low signal. The reference voltage Vref is a value obtained by compensating a voltage difference according to operations of lamps connected to the second winding N2 and the third winding N3 at the secondary side of the transformer 133.

The high signal of the comparator 185 drives the driving control circuit 191C to output the driving stopping signal to the controller 110.

FIG. 9 is a flowchart showing a method for controlling driving of a lamp according to the embodiment.

Referring to FIG. 9, the controller outputs a control signal to a switching module (step S101). The switching module operates by the control signal to output lamp driving power so that the trans-module is driven (step S102).

The trans-module converts an AC signal input from the switching module into a positive phase signal and a negative phase signal having high voltage to be supplied to a plurality of lamps (step S103).

The open lamp detecting module detects a positive phase signal and a negative phase signal having low voltage feedback from the trans-module (step S104). The positive phase signal and the negative phase signal are added to each other in a unit of a pair, and then an addition result is output (step S105). The addition result may be added to another addition result.

Then, if the addition result is a high signal, the driving stopping signal is output to the controller (steps S106 and S107). If the addition result is a low signal, the driving maintaining signal is output to the controller (step S108).

As described above, the apparatus for driving a lamp can stably control a backlight assembly through the driving control of a lamp, so that the reliability for a liquid crystal display may be improved.

INDUSTRIAL APPLICABILITY

In the apparatus and the method for controlling the driving of a lamp according to the embodiment, the open state of the lamp and the abnormal voltage of a transformer can be detected through an arithmetic scheme of adding a couple of signals having polarities opposite to each other to each other.

In addition, the circuit parts of the open lamp detecting module can be simplified. Accordingly, the manufacturing costs can be reduced, and the defective probability can be reduced.

Further, the open state of the lamp is detected, thereby improving the reliability of a backlight assembly and a liquid crystal display.

The invention claimed is:

1. An apparatus for controlling driving of a lamp, the apparatus comprising:
    a plurality of lamps;
    a switching module for switching supplied power to output an alternating current (AC) signal;
    a trans-module for converting the alternating signal into high-voltage signals having different phases to supply the high-voltage signals to the lamps;
    an open lamp detecting module for adding low-voltage signals having different phases fedback from the trans-module to detect open states of the lamps; and
    a controller for controlling an operation of the switching module by a signal detected in the open lamp detecting module.

2. The apparatus as claimed in claim 1, wherein the lamp is one of a cold cathode fluorescent lamp (CCFL), an external electrode fluorescent lamp (EEFL), a hot cathode fluorescent lamp (HCFL), and an external and internal electrode fluorescent lamp (EIFL).

3. The apparatus as claimed in claim 1, wherein the trans-module comprises at least one transformer having a primary winding section connected to the switching module and a secondary winding section connected to the lamp and the open lamp detecting module.

4. The apparatus as claimed in claim 1, wherein the trans-module comprises at least one transformer having a primary side around which first coil is wound and a secondary side around which second and third coils are wound, in which at least one lamp is connected to high-voltage terminals of the second and third coils wound around the secondary side of the transformer, and the open lamp detecting module is connected to low-voltage terminals of the second and third coils.

5. The apparatus as claimed in claim 1, wherein the signals having different phases have a phase difference of 180°.

6. The apparatus as claimed in claim 1, wherein the open lamp detecting module detects a middle-voltage of the signals having different phases fedback from the trans-module.

7. The apparatus as claimed in claim 1, wherein the open lamp detecting module outputs the signals having different phases fedback from the trans-module by adding the signals in a unit of a pair.

8. The apparatus as claimed in claim 5, wherein the open lamp detecting module outputs a signal by adding addition results, which are obtained by adding a positive signal to at least one negative signal fedback from the trans-module or which are obtained by adding a negative signal to at least one positive signal fedback from the trans-module.

9. The apparatus as claimed in claim 1, wherein the switching module, the transmodule, an open lamp detecting module and the controller are provided at both end portions of the lamp unit.

10. The apparatus as claimed in claim 5, wherein the open lamp detecting module comprises:
    a plurality of signal detecting circuits for detecting signals fedback from a transformer of the trans-module by branching the signals through different paths;
    an addition circuit for adding a positive signal to a negative signal in a unit of a pair, which are detected by the signal detecting circuits; and
    a driving controlling circuit for outputting a driving stopping signal and a driving maintaining signal to the controller according to the addition result of the addition circuit.

11. The apparatus as claimed in claim 10, wherein the addition circuit comprises:
    a first addition circuit for adding a positive signal to a negative signal in a unit of a pair, in which the positive and negative signals are fedback from a same transformer;
    a second addition circuit for adding a positive signal to a negative signal in a unit of a pair, in which the positive and negative signals are fedback from different transformers; and
    a third addition circuit for adding the addition result of the first addition circuit to the addition result of the second addition circuit.

12. The apparatus as claimed in claim 10, comprising:
    a protection circuit being between the signal detecting circuit and the driving controlling circuit to blocking voltage that flows in a reverse direction; and
    a comparator for comparing the addition result of the addition circuit with reference voltage.

13. An apparatus for controlling driving of a lamp, the apparatus comprising:
    a plurality of lamps having first and second electrodes; and
    an inverter connected to at least one electrode of the lamp, wherein the inverter comprises:
    a switching module for switching supplied power to output alternating current (AC);
    a trans-module for converting the alternating current (AC) of the switching module into a positive signal and a negative signal having high voltage to supply the positive signal and the negative signal to the lamp;
    an open lamp detecting module for adding a positive signal and a negative signal having low voltage, which are fedback from the trans-module, to detect an open state of the lamp; and
    a controller for controlling an operation of the switching module by a signal detected in the open lamp detecting module.

14. The apparatus as claimed in claim 13, wherein the open lamp detecting module detects middle voltage between a positive signal and a negative signal which are fedback from the trans-module.

15. The apparatus as claimed in claim 13, wherein the open lamp detecting module comprises:
    a division resistor for detecting a positive signal and a negative signal, which are fedback from the trans-module, by branching the signals through two paths; and
    a first addition node which adds the positive signal to the negative signal in a unit of a pair and a second addition node which performs an addition operation based on the addition result of the first addition node.

16. The apparatus as claimed in claim 15, comprising a transistor for outputting a driving stopping signal, or a driving maintaining signal to the controller according to the addition result of the second addition node.

17. The apparatus as claimed in claim 13, wherein a plurality of the inverter are connected at both electrodes of the lamps.

18. The apparatus as claimed in claim 13, wherein the trans-module comprises one transformer for outputting the positive signal and the negative signal having high voltage to the first electrode or the second electrode of the lamps.

19. A method for controlling driving of a lamp, the method comprising the steps of:

operating a switching module by a control signal of a controller;

allowing each transformer to supply a positive signal and a negative signal having high voltage according to an operation of the switching module;

detecting an open state of a lamp by adding a positive signal to a negative signal having low voltage, which are fedback from the transformer; and outputting a driving stopping signal to the controller if the open state of the lamp is detected.

20. The method as claimed in claim 19, wherein the step of detecting the open state of the lamp comprises the steps of:

detecting signals fedback from the transformer through different paths;

adding the positive signal and the negative signal, which are detected, to each other; and detecting the open state through an addition operation for the addition result.

* * * * *